United States Patent
Kämper et al.

(10) Patent No.: US 7,785,702 B2
(45) Date of Patent: Aug. 31, 2010

(54) SORPTIVE STORAGE UNIT FOR GASES

(76) Inventors: Stefan Kämper, August-Bagel-Strasse 20, D-40878 Ratingen (DE); Kai Mierau, Azaleenweg 31, D-40822 Mettmann (DE); Andreas Arnold, Kettlerskamp 8, D-44269 Dortmund (DE); Peter Heinrich, James-Krüss-Strasse 7, D-47447 Moers (DE); Michael Klemund, Graf-Recke-Strasse 75, D-40239 Düsseldorf (DE); Ernest De Ruiter, Höhenstrasse 57a, D-51381 Leverkusen (DE)

( * ) Notice: Subject to any disclaimer, the term of this patent is extended or adjusted under 35 U.S.C. 154(b) by 0 days.

(21) Appl. No.: 11/640,777

(22) Filed: Dec. 18, 2006

(65) Prior Publication Data
US 2007/0141322 A1    Jun. 21, 2007

(30) Foreign Application Priority Data
Dec. 19, 2005    (DE) .............. 10 2005 061 121
Mar. 8, 2006     (DE) .............. 10 2006 010 636

(51) Int. Cl.
*B32B 3/26*  (2006.01)
*B32B 3/06*  (2006.01)
*B32B 3/00*  (2006.01)
*B32B 7/12*  (2006.01)

(52) U.S. Cl. .............. 428/304.4; 428/307.3; 428/316.6; 428/317.1

(58) Field of Classification Search .............. 428/304.4, 428/307.3, 316.6, 317.1
See application file for complete search history.

(56) References Cited

U.S. PATENT DOCUMENTS

| | | | | |
|---|---|---|---|---|
| 3,477,210 A | * | 11/1969 | Hervert .................. | 96/144 |
| 3,650,993 A | * | 3/1972 | Zocco et al. ............. | 521/131 |
| 3,865,758 A | * | 2/1975 | Yoshida et al. ........... | 521/63 |
| 4,713,944 A | | 12/1987 | Januschkowetz .......... | 62/480 |
| 5,663,951 A | | 9/1997 | Danneels et al. | |
| 5,851,270 A | | 12/1998 | Olander | |
| 6,099,811 A | | 8/2000 | Stetson et al. | |
| 6,589,444 B2 | | 7/2003 | Thomas et al. | |
| 6,672,103 B1 | | 1/2004 | Stach et al. .............. | 62/480 |

FOREIGN PATENT DOCUMENTS

| | | |
|---|---|---|
| DE | 2804154 B1 | 1/1979 |
| DE | 35 32 093 C1 | 4/1987 |
| DE | 198 11 302 A1 | 2/1999 |
| DE | 199 63 322 A1 | 6/2001 |
| DE | 100 06 825 A1 | 8/2001 |
| DE | 10047503 A1 | 4/2002 |

(Continued)

*Primary Examiner*—Victor S Chang
(74) *Attorney, Agent, or Firm*—Edward E. Sowers; Brannon & Sowers PC

(57) ABSTRACT

The present invention relates to a storage unit for gases, in particular a sorptive storage, with the storage unit comprising a sorbent for the reversible uptake of the gases to be stored and the sorbent being based on discrete sorptive particles. The sorptive particles are embedded in a solid gas-permeable three-dimensional support having a foam structure and/or are fixed thereto. The storage unit is particularly suitable for the storage of combustible or fossil gases, e.g. hydrogen, natural gas and the like, and thus as gas storage unit in power stations and motor vehicles.

22 Claims, 1 Drawing Sheet

FOREIGN PATENT DOCUMENTS

| | | |
|---|---|---|
| DE | 10159652 A1 | 9/2002 |
| DE | 102004022766 A1 | 12/2005 |
| GB | 2013102 A | 8/1979 |
| WO | WO 01/44737 A1 | 6/2001 |
| WO | WO 03/039704 A2 | 5/2003 |
| WO | WO 2005/082219 A1 | 9/2005 |

* cited by examiner

SORPTIVE STORAGE UNIT FOR GASES

CROSS REFERENCES TO RELATED APPLICATIONS

This application claims priority to German Patent Application No. DE 10 2005 061 121.4, filed Dec. 19, 2005, and also claims priority to German Patent Application No. DE 10 2006 010 636.9, filed Mar. 8, 2006, entitled "SORPTIVE STORAGE UNIT FOR GASES". Both references are expressly incorporated by reference herein, in their entirety.

BACKGROUND OF THE INVENTION

The present invention relates to the technical field of storage of gases. In particular, the present invention relates to a storage unit for gases, in particular a sorptive storage, and its use. Furthermore, the present invention relates to the use of a solid gas-permeable three-dimensional support having a foam structure for reversible storage, in particular sorptive storage, of gases.

For many applications it is necessary to store gases, in particular to store them reversibly so that they can be liberated again when required. The storage of gases should be effected at the greatest possible density in these applications.

In the prior art, porous materials are used in beds in order to store these gases. However, this is associated with many disadvantages: beds of porous materials are very difficult to keep uniform. Since these beds are very dense, uniform loading in a short time is usually not possible. The release when required of gases stored in beds of porous materials is also not unproblematical and, in particular, takes a relatively long time. A further disadvantage of beds is that formation of channels can occur during loading, so that the storage material for the gases is not fully or not uniformly utilized for storage of the gases. The pressure drop occurring during the loading process as a result of the density of the bed is also a problem which is difficult to manage.

Sorptive storages as storage units for energy or gases based on beds of suitable sorptive materials are known from the prior art. However, these all start out from beds of sorptive particles (cf. DE 199 63 322 A1, DE 198 11 302 A1, DE 100 06 825 A1 and DE 35 32 093 C1). The abovementioned problems are, however, associated with these sorptive storage devices.

It is therefore an object of the present invention to provide a storage unit for gases, in particular a sorptive storage, which at least largely avoids the abovementioned disadvantages of the prior art or else at least reduces them. In particular, such a storage unit should be suitable for the reversible storage of a wide variety of gases, e.g. hydrogen, natural gas, hydrocarbon-based gases, etc.

The problem indicated above is, in the context of the present invention, solved by a storage unit for gases, in particular a sorptive storage, according to the present disclosure. Further, advantageous embodiments of the storage unit of the invention are subject matter of the relevant independent claims.

The present invention further provides for the use of the gas storage unit of the invention according to the present disclosure.

Finally, the present invention provides for the use of a solid gas-permeable three-dimensional support having a foam structure for reversible storage, in particular sorptive storage of gases according to the present disclosure.

The present invention thus provides, according to a first aspect of the present disclosure, a storage unit for gases or a unit for the reversible storage of gases, in particular a sorptive storage, with the storage unit comprising a sorbent for the reversible uptake of the gases to be stored and the sorbent being based on discrete sorptive particles. A characteristic of the present invention is, in particular, that the sorptive particles are embedded in a solid gas-permeable three-dimensional support having a foam structure and/or are fixed thereto. In other words, the solid gas-permeable three-dimensional support having a foam structure is laden with the discrete sorptive particles serving as sorbent.

The sorbent used according to the invention is able to reversibly take up or reversibly sorb, in particular adsorb and/or absorb, preferably adsorb, the gases to be stored and liberate them again as required in the case of discharge, in particular by means of desorption. The term "reversible" is therefore used in respect of gas storage for the purposes of the present invention.

For the purposes of the present invention, the term "sorption" is used as a collective term for all processes in which a substance is taken up by another substance which is in contact with the first, in the present case the gas by the sorbent. Examples are adsorption, absorption, chemisorption and physisorption, persorption, resorption, etc. The reverse process is, for the purposes of the invention, referred to as desorption. Here, the sorbed substance is referred to as sorbate and the substance having the sorptive action is referred to as sorption medium or sorbent. According to the invention, sorption preferably occurs by means of adsorption and/or absorption, preferably by means of adsorption.

For further details regarding the concept of sorption and of adsorption, absorption, desorption, etc., reference may be made to Römpp Chemielexikon, 10th edition, Georg Thieme Verlag, Stuttgart/N.Y., there the relevant keywords: "Sorption", "Adsorption", "Absorption" and "Desorption", and also the literature referred to therein.

As described above, a characteristic of the present invention is that a support structure based on a foam which is laden with the sorptive particles is used. For the purposes of the present invention, a foam is a structure made up, in the state in which it is used, of gas-filled, spherical or polyhedral cells which are bounded and separated from one another by solid cell struts. The cell struts themselves are joined via nodes and thus form a contiguous framework. Foam lamellae can extend between the cell struts (=closed-celled or closed-pored foam); in the case of open-celled or open-pored foams, these have been at least partly destroyed. For further details regarding the term foam, reference may be made to Römpp Chemielexikon, 10th edition, Georg Thieme Verlag, Stuttgart/N.Y., keyword: "Schaum", and the literature referred to therein.

In an embodiment which is preferred according to the invention, an open-pored and/or open-celled foam, in particular foam material, can be used as support for the sorptive particles. According to the invention, particular preference is given to using an open-pored and/or open-celled foam material.

For the purposes of the invention, the term "foam material" refers, in particular, to materials having preferably open cells or pores distributed over their entire mass and having a bulk density which is lower than that of the framework or foam substance. Both organic polymers (e.g. foam plastics) and inorganic materials (e.g. foam glass, foam metals, etc.) can function as framework substance.

The foam materials can, in accordance with DIN 7726 (May 1982) be classified as rigid foam materials, semirigid foam materials, flexible foam materials, elastic foam materials and rubbery-elastic foam materials as a function of their deformation resistance under a compressive load: elastic foam materials are those which do not have a permanent deformation of more than 2% of their original volume after compressive deformation in accordance with DIN 53580 up to 50% of their thickness. On the other hand, rigid foam materials are, in accordance with DIN 7726 (May 1982), foam materials which display a relatively high resistance when deformed under a compressive load (compressive stress at 10% deformation or compressive strength in accordance with DIN 53421, June 1984, $\geqq 80$ kPa).

Foam materials are classified further according to, inter alia, the framework substance (polyurethane foams, polystyrene foams, polyolefin foams, polyvinyl chloride foams, etc.), the materials class of the framework substance (elastomeric foam materials, thermoelastomeric foam materials, thermoplastic foam materials, etc.), the type, size and shape of the foam material cells (open-celled foam materials, closed-celled foam materials, mixed-celled foam materials, coarse- and fine-celled foam materials, spherical foam materials, honeycomb foam materials, double-layered or true foam materials and single-layered or false foam materials, etc.), according to the density (light foam materials having densities of $\leqq 100$ kg/m$^3$ and heavy foam materials having densities of $\geqq 100$ kg/m$^3$) or the density distribution (structured foam materials or integral foam materials).

For further details regarding foam materials, reference may be made to Römpp Chemielexikon, 10th edition, Georg Thieme Verlag, Stuttgart/N.Y., keywords: Schaumstoffe", "Hartschaumstoffe", "Weichschaumstoffe", "Integralschaumstoffe" and "Schaum", and the literature referred to therein.

As stated above, an in particular open-pored and/or open-celled foam or foam material is, according to the invention, used as support for the sorbent. Preference is given to using a foam material based on at least one organic polymer, in particular a foam material based on polyurethanes, polyolefins, polystyrenes, polyvinyl chlorides, polyisocyanurates and formaldehyde resins, particularly preferably a foam material based on polyurethanes. The support used is, according to the invention, particularly preferably based on an open-pored and/or open-celled polyurethane-based foam material, in particular a flexible polyurethane foam material.

For the reversible storage of gases, the three-dimensional support structure with the sorptive particles fixed thereto is generally cooled to very low temperatures, in particular to the temperature of liquid nitrogen (−195.8° C. at atmospheric pressure) or below, and in the case of liberation as required, brought back to higher temperatures. However, this process is known per se to those skilled in the art, so that no further details need to be given here.

In an embodiment which is particularly preferred according to the invention, the support for the sorptive particles is compressed, in particular by a factor of from 1.2 to 3.0, (i.e., by a ratio of original volume/compressed volume of from 1.2/1 to 3/1), after being loaded with the sorptive particles. For this purpose, the support is preferably a compressible foam, in particular foam material, preferably a flexible foam material and in an embodiment which is particularly preferred according to the invention a polyurethane foam material, which is compressed, in particular by a factor of from 1.2 to 3.0, i.e. by a ratio of original volume/compressed volume of from 1.2/1 to 3/1, after being loaded with the sorptive particles. Compression enables the weight per unit area and thus the weight per unit volume to be increased by the corresponding compression factor. This for the first time produces structures which have a density close to that of a bed but are still sufficiently gas-permeable for efficient transport of gases between the sorptive particles to be possible. The referenced ratio of original volume/compress volume of from 1.2/1 to 3/1 can also be expressed in terms of what percent of the original volume or size of the support is represented by the compressed volume for the reduced size of the support. In mathematical terms, the referenced 1.2/1 corresponds to a 16.67% reduction in size and the 3/1 corresponds to a 66.67% reduction in size.

The open support structures result, in the context of the present invention, in a significantly accelerated loading and discharge process, which is a great advantage.

The compressed state of the support, in particular the foam or foam material, can be maintained, for example, by means of the container or tank of the storage unit of the invention. As an alternative which is preferred according to the invention, the compressed state of the support, in particular the foam or foam material, can be maintained by means of subsequent, in particular thermal or chemical, curing. For this purpose, it is possible to use foams or foam materials which cure thermally as a result of heating after the compression process. However, preference is given, according to the invention, to impregnating the support, i.e. the foam or foam material, with a chemical curing agent and subsequently curing it, with the curing agent advantageously being an adhesive or another adhesive composition which simultaneously serves to fix the sorptive particles. In this way, the sorptive particles can be fixed to the support by means of an adhesive composition, in particular an adhesive.

For this purpose, the foam or foam material can be impregnated or treated with the adhesive or the adhesive composition and subsequently loaded with the sorptive particles which are fixed to the support by means of the adhesive or the adhesive composition, and finally compressed and heated or cured in the compressed state. Excess adhesive can be removed from the foam or foam material, e.g. by squeezing of the foam (e.g. by calendering), before the heating step, either immediately after loading with the adhesive or else after loading with the sorbent.

In general, porous sorptive particles, i.e. sorptive particles which have pores for the reversible uptake and/or storage of gases, are used as sorbents. In particular, these sorptive particles are able to reversibly adsorptively and/or absorptively, preferably adsorptively, take up the gases to be stored or store them reversibly and liberate them again, in particular desorb them, when required, in particular as a function of temperature.

As regards the sorptive particles themselves, these thus have a porous structure. According to the invention, preference is given to using grain-shaped, particularly preferably spherical, sorptive particles.

According to the invention, preference is given to using sorptive particles having a mean particle diameter in the range from 0.01 to 2.0 mm, in particular from 0.05 to 1.0 mm, preferably from 0.1 to 1.0 mm.

The sorbent can, in particular, be selected from the group consisting of activated carbon; zeolites; inorganic oxides, in particular silicon dioxides, silica gels and aluminium oxides; molecular sieves; granulated minerals; clathrates; and mixtures thereof. A particularly preferred sorbent is activated carbon, which has been found to be particularly useful as sorbent for the purposes of the present invention.

To store gas efficiently, the sorbent, in particular the activated carbon, should have a high specific surface area (BET surface area). According to the invention, the specific surface area of the sorbent, in particular the activated carbon, should preferably be at least 500 m$^2$/g, more preferably at least 750 m$^2$/g, particularly preferably at least 1,000 m$^2$/g, very particularly preferably at least 1,200 m²/g. In general, the specific surface area (BET surface area) of the sorbent used, in particular the activated carbon, is in the range from 500 to 2,500 m²/g, in particular from 750 to 2,250 m²/g, preferably from 900 to 2,000 m²/g, particularly preferably from 1,000 to 1,750 m²/g. Sorbents having the abovementioned BET surface areas are particularly suitable for taking up or adsorptively binding a large amount of the gases to be stored in a relatively short time.

As regards the BET method, reference may be made, for example, to Römpp Chemielexikon, 10th edition, Georg Thieme Verlag, Stuttgart/N.Y., keyword: "BET-Methode", and the literature referred to therein, Winnacker-Küchler (3rd edition), volume 7, page 93 ff. and Z. Anal. Chem. 238, pages 187 to 193 (1968).

To be able to withstand mechanical stresses, too, the sorptive particles, in particular the activated carbon particles, preferably the activated carbon grains or activated carbon spheres, should have a bursting pressure (rupture pressure) of at least 5 newton, in particular a rupture pressure in the range from 5 newton to 20 newton, per particle.

The applicant has discovered that particles having a large proportion by volume of micropores, based on the total pore volume of the sorbent, are particularly useful as sorbent, in particular as activated carbon. For the purposes of the present invention, the micropore volume is the pore volume provided by pores having a pore diameter of $\leq 25$ Å (2.5 nm), in particular $\leq 20$ Å (2.0 nm). The applicant has surprisingly discovered that gas storage is particularly efficient when the proportion by volume of micropores in the sorbent is particularly high. Without being tied to a particular theory, the particularly good gas storage by means of sorbents, in particular activated carbon, having a large proportion by volume of micropores can be attributed to the micropores being able, because of their only small size, to interact from all sides or walls with the gas molecules to be sorbed or adsorbed.

The applicant has surprisingly discovered that storage of hydrogen can be carried out particularly efficiently even at relatively high temperatures above the boiling point of hydrogen (−252.77° C. at atmospheric pressure), namely particularly at the temperature of liquid nitrogen (−195.8° C. at atmospheric pressure) in the case of sorbents, preferably activated carbon, having a large proportion by volume of micropores.

In an embodiment which is preferred according to the invention, activated carbon in the form of activated carbon grains, preferably activated carbon spheres, in particular activated carbon spheres having mean particle diameters in the range from 0.01 to 2.0 mm, in particular from 0.05 to 1.0 mm, preferably from 0.1 to 1.0 mm, is thus used as sorbent.

The physicochemical properties, apart from the abovementioned prerequisites, of an activated carbon which is particularly preferably used according to the invention as sorbent are described below, with the physicochemical properties indicated below being based on pore diameters in the range of from >0 Å up to 400 Å unless indicated otherwise.

Thus, an activated carbon which is preferably used as sorbent advantageously has, in addition to the other abovementioned properties, an adsorption volume $V_{ads}$ of at least 250 cm³/g, in particular at least 300 cm³/g, preferably at least 350 cm³/g, particularly preferably 400 cm³/g. In general, the adsorption volume $V_{ads}$ is in the range from 250 to 1,000 cm³/g, in particular from 300 to 900 cm³/g, preferably from 350 to 750 cm³/g. The abovementioned figures are based on a measured partial pressure $p/p_0$ of 0.995.

The activated carbon which is preferably used according to the invention has, in particular, a total pore volume measured by the Gurvich method of at least 0.05 cm³/g, in particular at least 0.55 cm³/g, preferably at least 0.60 cm³/g, particularly preferably at least 0.65 cm³/g, very particularly preferably at least 0.7 cm³/g. In general, the total pore volume measured by the Gurvich method of the preferred activated carbon is in the range from 0.50 to 0.90 cm³/g, in particular from 0.55 to 0.85 cm³/g, preferably from 0.60 to 0.80 cm³/g, particularly preferably from 0.65 to 0.80 cm³/g, very particularly preferably from 0.70 to 0.75 cm³/g.

Further details regarding the determination of the total pore volume by the Gurvich method may be found in L. Gurvich (1915), J. Phys. Chem. Soc. Russ. 47, 805, and also in S. Lowell et al., Characterization of Porous Solids and Powders: Surface Area Pore Size and Density, Kluwer Academic Publishers, Article Technology Series, pages 111 ff.

As indicated above, the proportion by volume of micropores in the activated carbon which is preferably used according to the invention is particularly high. In particular, the proportion by volume of micropores, (i.e. the proportion of the pore volume which is due to pores having pore diameters of $\leq 25$ Å, preferably $\leq 20$ Å), based on the total pore volume of the activated carbon, is at least 60%, in particular at least 65%, preferably at least 70%. In general, the proportion by volume of micropores in the activated carbon used, based on the total pore volume of the activated carbon, is in the range from 60 to 95%, in particular from 65 to 90%, preferably from 70 to 85%. An activated carbon having such microporosity is particularly suitable for the storage of gases, in particular hydrogen.

An activated carbon which is preferably used according to the invention has a micropore volume, i.e. a micropore volume formed by pores having pore diameters of $\leq 25$ Å, preferably $\leq 20$ Å, measured by the carbon black method of at least 0.40 cm³/g, in particular at least 0.45 cm³/g, preferably at least 0.50 cm³/g. In general, this micropore volume measured by the carbon black method is in the range from 0.40 to 0.8 cm³/g, in particular from 0.45 to 0.75 cm³/g, preferably from 0.50 to 0.6 cm³/g.

Further details regarding the determination of the pore surface area by the carbon black method may be found, for example, in R. W. Magee, Evaluation of the External Surface Area of Carbon Black by Nitrogen Adsorption, presented at the Meeting of the Rubber Division of the American Chem. Soc., October 1994, referred to in, for example: Quantachrome Instruments, AUTOSORB-1, AS1 Win Version 1.50, Operating Manual, P/N 05061, Quantachrome Instruments 2004, Florida, USA, pages 71 ff.

Owing to the high microporosity of the activated carbon which is preferably used as sorbent according to the invention, this likewise has a high specific micropore surface area fraction. The specific micropore surface area fraction (i.e. the proportion of the surface area made up by pores having pore diameters of $\leq 25$ Å, preferably $\leq 20$ Å) is at least 70%, in particular at least 75%, preferably at least 80%, very particularly preferably at least 85%, based on the specific total surface area (BET) of the activated carbon. In particular, the micropore surface area fraction is in the range from 70 to 95%, in particular from 75 to 95%, preferably from 80 to 90%.

The activated carbon which is preferably used as sorbent according to the invention has, owing to its microporosity, a large micropore surface area. In particular, the micropore surface area measured by the carbon black method (i.e. the micropore surface area formed by pores having pore diameters of $\leq 25$ Å, preferably $\leq 20$ Å) is at least 400 m²/g, in particular at least 800 m²/g, preferably at least 1,000 m²/g, particularly preferably at least 1,200 m²/g. In a preferred embodiment, the micropore surface area of the activated carbon used is in the range from 400 to 1,750 m$^2$/g, in particular from 800 to 1,500 m$^2$/g, preferably from 1,000 to 1,400 m$^2$/g, particularly preferably from 1,100 to 1,300 m$^2$/g.

According to the invention, preference is given to using a microporous activated carbon having a mean pore diameter (average pore diameter) of not more than 35 Å, preferably not more than 30 Å, particularly preferably not more than 25 Å, as sorbent. In particular, the mean pore diameter of the activated carbon used as sorbent is in the range from 15 to 35 Å, in particular from 15 to 30 Å, preferably from 15 to 25 Å.

The bulk density of the activated carbon used according to the invention as sorbent is generally in the range from 700 to 975 g/cm$^3$, in particular from 750 to 950 g/cm$^3$, preferably from 800 to 900 g/cm$^3$.

To achieve a particularly good storage performance, it is advantageous for the total porosity of the sorbent, in particular of the activated carbon which is preferably used as sorbent, to be in the range from 40 to 70%, in particular from 45 to 65%, preferably from 50 to 60%.

According to the invention, preference is given to using an activated carbon having a specific total pore volume in the range from 0.1 to 2.5 cm$^3$/g, in particular from 0.2 to 2.0 cm$^3$/g, preferably from 0.3 to 1.5 cm$^3$/g, particularly preferably from 0.4 to 1.0 cm$^3$/g, as sorbent. The proportion of pore diameters ≦36 Å is at least 65%, in particular at least 70%, preferably at least 75%, and can reach values up to 95%, in particular up to 90%.

An activated carbon which is particularly suitable as sorbent according to the invention and meets the abovementioned properties and specifications is marketed, for example, by Blücher GmbH, Erkrath, Germany, or AdsorTech GmbH, Premnitz, Germany.

The amount in which the sorbent, in particular the activated carbon, is present in the support can vary within a wide range. In general, the loading of the support by sorbent is from 0.01 to 1 g/cm$^3$, preferably from 0.1 to 0.6 g/cm$^3$. However, in individual cases or as a function of the application, it may be necessary to deviate from the abovementioned values.

As stated above, the storage unit of the invention can be used for the reversible storage of gases of any type, for example for the storage of combustible gases or heating gases, e.g. natural gas, hydrogen, hydrocarbon gases (e.g. methane and ethane) or the like.

The storage unit of the invention can in particular be used as an energy storage, in particular a gas storage, for motor vehicles, internal combustion engines of any type and power stations.

Owing to the presence of the three-dimensional support having a foam structure to which the discrete sorptive particles are fixed, it is possible to create a gas-permeable structure which allows efficient transport between the sorptive particles both during the loading process (sorption process) and the discharge process (desorption). In addition, compression (e.g. thermal compression) of the support in the production process enables the weight per unit area and thus the weight per unit volume of the support structure to be increased by a factor of from 1.2 to 3; in this way, it is possible for the first time to provide structures for such a storage unit which have a density close to that of a bed but are sufficiently gas-permeable for efficient transport between the sorptive particles to be possible. The open structures result in a significantly accelerated loading and discharge process, which is a great advantage, e.g. when used as natural gas or hydrogen storage at low temperatures.

When, in particular, a microporous activated carbon of the type defined above is used as sorbent, the efficiency of the storage unit of the invention can be increased to a particular degree: the applicant has surprisingly discovered that an activated carbon having a relatively high specific surface area (BET surface area) combined with a relatively large micropore volume fraction allows particularly efficient storage, for example of hydrogen, even at relatively high temperatures, namely those of liquid nitrogen which are more than 50° C. above the temperature of liquid hydrogen.

The storage unit also usually has a closable, in particular hermetically sealable, container, in particular a tank, for accommodating the support laden with the sorptive particles. In other words, in the state in which the storage unit is used, the actual storage medium (i.e. the support having a foam structure which is laden with the sorptive particles) is located in a container or tank. In general, the storage unit or the container, in particular the tank, is thermally insulated or constructed so that it can be thermally insulated. The storage unit or the container, in particular the tank, is advantageously constructed so as to be able to be cooled. Furthermore, the storage unit or the container has at least one inlet and at least one outlet for the gases to be stored and liberated again.

Further advantageous properties, aspects and features of the present invention can be derived from the following description of an example depicted in the figures.

BRIEF SUMMARY

A storage unit for the sorptive storage of gases, with the storage unit comprising a sorbent for the reversible uptake of the gases to be stored and the sorbent being based on discrete sorptive particles, wherein the sorptive particles are embedded into or fixed to a solid gas-permeable three-dimensional support having a foam structure.

One object of the present disclosure is to describe an improved sorptive storage unit for gases.

DETAILED DESCRIPTION

Figures 1A, 1B:
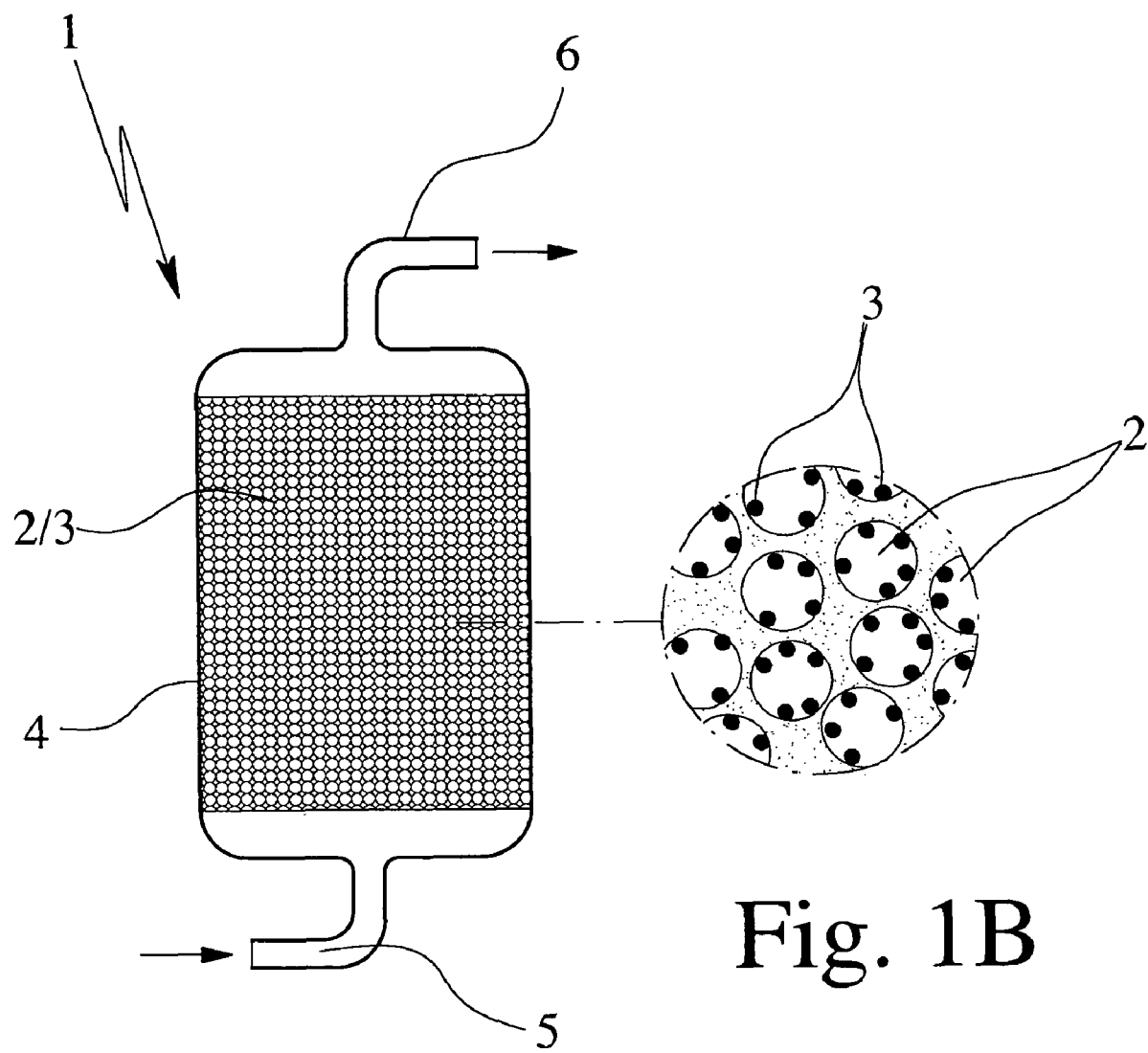
FIG. 1A schematically shows a section through a storage unit according to the invention for gases according to one embodiment of the present invention.
FIG. 1B shows an enlarged section through the layer structure of the storage unit according to the invention.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

FIG. 1A schematically shows a section through a storage unit 1 according to the invention for gases corresponding to a specific embodiment. As can be seen from the enlarged section FIG. 1B, the storage unit 1 comprises a sorbent 3 for the reversible uptake of the gases to be stored, with the sorbent 3 being based on discrete sorptive particles. The sorptive particles 3 are embedded in a solid gas-permeable three-dimensional support 2 having a foam structure and/or fixed thereto.

As can also be seen from FIG. 1A, the storage unit 1 has a closable, in particular hermetically sealable, container 4, in particular a tank, for accommodating the support 2 laden with the sorptive particles 3. Furthermore, the storage unit 1 has an inlet 5 and an outlet 6 for the gases being stored.

Finally, the present invention further provides for the use of a solid gas-permeable three-dimensional support having a foam structure for the reversible storage, in particular sorptive storage, of gases, with the support being treated with a sorbent for the reversible uptake of the gases to be stored, in particular the sorbent is embedded in the support and/or fixed thereto, and the sorbent being based on discrete sorptive particles. As regards the inventive use according to this aspect of the present invention, reference may be made to what has been said above with regard to the storage unit of the invention, which statements correspondingly apply to the use according to the invention, so that they can be referred to in order to avoid unnecessary repetition.

Further embodiments, modifications and variations of the present invention can readily be recognized and realized by a person skilled in the art from reading the description without thereby going outside the scope of the present invention.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A storage unit for the sorptive storage of gases, said storage unit comprising:
   a sorbent for the reversible uptake of the gases to be stored, said sorbent being based on discrete sorptive particles wherein the sorptive particles have a grain shape, the mean particle diameter being in the range of from 0.01 to 2.0 mm; and
   a solid gas-permeable three-dimensional support of foam material, said foam material having an original volume that is loaded with said discrete sorptive particles and said foam material having a compressed volume in a ratio of original volume/compressed volume from between 1.2/1 to 3/1, said compressed volume state being maintained as a result of being cured wherein said foam material is impregnated with a chemical curing agent and subsequently cured in the compressed volume state, the curing agent being adhesive means which at the same time serves to fix the sorptive particles to the foam material, wherein the foam material is loaded with the sorptive particles subsequently to the impregnation with the curing agent and prior to the curing in the compressed volume state.

2. The storage unit according to claim 1, wherein said foam material is an open-pored or open-celled foam material based on at least one organic polymer selected from the group consisting of polyurethanes, polyolefins, polystyrenes, polyvinyl chlorides, polyisocyanurates and formaldehyde resins.

3. The storage unit according to claim 1, wherein the sorptive particles are loaded into said foam material by being fixed to the support by means of adhesive.

4. The storage unit according to claim 1, wherein the sorptive particles have pores for the reversible uptake or storage of gases and wherein the sorptive particles are capable of reversibly adsorbing or absorbing the gases to be stored and of liberating them again by desorption when required as a function of temperature.

5. The storage unit according to claim 1, wherein the sorptive particles have a porous structure.

6. The storage unit according to claim 1, wherein the sorbent is selected from the group consisting of activated carbon; zeolites; inorganic oxides, silica gels and aluminium oxides; molecular sieves; granulated minerals; clathrates; and mixtures thereof.

7. The storage unit according to claim 1, wherein the sorbent has a specific surface area (BET surface area) of at least 500 $m^2/g$ and in the range of from 500 to 2,500 $m^2/g$.

8. The storage unit according to claim 1, wherein the sorptive particles have a bursting pressure of at least 5 newton per particle.

9. The storage unit according to claim 1, wherein the sorbent is activated carbon having a large proportion by volume of micropores, based on the total pore volume of the sorbent.

10. The storage unit according to claim 1, wherein the sorbent is activated carbon in the form of activated carbon grains having mean particle diameters in the range from 0.01 to 2.0 mm.

11. The storage unit according to claim 1, wherein the sorbent is activated carbon having an adsorption volume $V_{ads}$ in the range of from 250 to 1,000 $cm^3/g$ and a total pore volume measured by the Gurvich method in the range of from 0.50 to 0.90 $cm^3/g$.

12. The storage unit according to claim 1, wherein the sorbent is activated carbon having a proportion by volume of micropores formed by pores having pore diameters of $\leq 25$ Å of at least 65%, based on the total pore volume.

13. The storage unit according to claim 1, wherein the sorbent is activated carbon having a micropore volume formed by pores having pore diameters of $\leq 25$ Å and measured by the carbon black method of at least 0.40 $cm^3/g$.

14. The storage unit according to claim 1, wherein the sorbent is activated carbon having a micropore surface area formed by pores having pore diameters of $\leq 25$ Å an measured by the carbon black method of at least 400 $m^2/g$.

15. The storage unit according to claim 1, wherein the sorbent is activated carbon having a mean pore diameter of not more than 35 Å.

16. The storage unit according to claim 1, wherein the sorbent has a total porosity of from 40 to 70%.

17. The storage unit according to claim 1, wherein the sorbent is activated, carbon having a specific total pore volume in the range from 0.1 to 2.5 $cm^3/g$, with the proportion of pores having pore diameters $\leq 36$ Å being at least 65%.

18. The storage unit according to claim 1, wherein said foam material has a sorbent loading of from 0.01 to 1 $g/cm^3$.

19. Use of a storage unit according to claim 1 for the reversible storage of gases.

20. Use of a storage unit according to claim 1 as energy storage.

21. Use of a solid gas-permeable three-dimensional support having a foam material structure for the reversible sorptive storage of gases, said foam material being loaded with a sorbent for the reversible uptake of said gases said sorbent being based on discrete sorptive particles, wherein the sorptive particles have a grain shape, the mean particle diameter being in the range of from 0.01 to 2.0 mm, wherein the three-dimensional support is compressed to a ratio of original volume/compressed volume from 1.2/1 to 3/1 after being loaded with the sorptive particles and wherein the compressed state of the three-dimensional support is maintained by subsequent curing of the support, wherein said foam material is impregnated with a chemical curing agent and subsequently cured in the compressed volume state, the curing agent being adhesive means which at the same time serves to fix the sorptive particles to the foam material, wherein the foam material is loaded with the sorptive particles subsequently to the impregnation with the curing agent and prior to the curing in the compressed volume state.

22. A storage unit for the sorptive storage of gases, said storage unit comprising:
- a sorbent for the reversible uptake of the gases to be stored, said sorbent being based on discrete activated carbon particles having (a) a grain shape, the mean particle diameter being in the range of from 0.01 to 2.0 mm and (b) a proportion by volume of micropores formed by pores having pore diameters of $\leqq 25$ Å of at least 65%, based on the total pore volume ; and
- a solid gas-permeable three-dimensional support of foam material, said foam material having an original volume that is loaded with said discrete sorptive particles and said foam material having a compressed volume in a ratio of original volume/compressed volume from between 1.2/1 to 3/1, said compressed volume state being maintained as a result of being cured wherein said foam material is impregnated with a chemical curing agent and subsequently cured in the compressed volume state, the curing agent being adhesive means which at the same time serves to fix the sorptive particles to the foam material, wherein the foam material is loaded with the sorptive particles subsequently to the impregnation with the curing agent and prior to the curing in the compressed volume state.

* * * * *